(12) United States Patent
Al Batal et al.

(10) Patent No.: US 10,870,788 B2
(45) Date of Patent: Dec. 22, 2020

(54) THERMALLY STABLE SURFACTANTS FOR OIL BASED DRILLING FLUIDS

(71) Applicants: Saudi Arabian Oil Company, Dhahran (SA); Durham University, Durham (GB)

(72) Inventors: Mona Al Batal, Durham (GB); Andrew Whiting, Durham (GB); Hugh Christopher Greenwell, Durham (GB); John Adrian Hall, Dhahran Hills (SA); Gasan Selman Alabedi, Cheshire (GB)

(73) Assignees: Saudi Arabian Oil Company, Dhahran (SA); Durham University, Durham (GB)

( * ) Notice: Subject to any disclaimer, the term of this patent is extended or adjusted under 35 U.S.C. 154(b) by 0 days.

(21) Appl. No.: 16/100,829

(22) Filed: Aug. 10, 2018

(65) Prior Publication Data

US 2019/0055446 A1 Feb. 21, 2019

Related U.S. Application Data

(60) Provisional application No. 62/545,799, filed on Aug. 15, 2017.

(51) Int. Cl.
*C09K 8/34* (2006.01)
*C09K 8/035* (2006.01)
*C09K 8/32* (2006.01)
*C09K 8/36* (2006.01)

(52) U.S. Cl.
CPC ............. *C09K 8/34* (2013.01); *C09K 8/035* (2013.01); *C09K 8/32* (2013.01); *C09K 8/36* (2013.01)

(58) Field of Classification Search
None
See application file for complete search history.

(56) References Cited

U.S. PATENT DOCUMENTS

| 2,322,848 A | 2/1859 | Saml | |
| 2,520,551 A | 8/1950 | Kilgore | |
| 3,125,517 A * | 3/1964 | Voda | ........................ C09K 8/36 507/131 |

(Continued)

FOREIGN PATENT DOCUMENTS

| CA | 2057024 A1 | 11/1990 |
| CN | 103032056 A | 4/2013 |

(Continued)

OTHER PUBLICATIONS

Search Report pertaining to International Patent Application PCT/US2018/046204 dated Oct. 31, 2018.

(Continued)

*Primary Examiner* — John J Figueroa
(74) *Attorney, Agent, or Firm* — Dinsmore & Shohl, LLP (57) ABSTRACT

Embodiments are directed to a surfactant of formula (I) and incorporation of one or more surfactants into drilling fluids. The surfactant having the following structure:

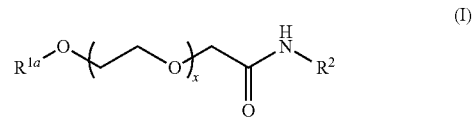

5 Claims, 4 Drawing Sheets

(56) References Cited

U.S. PATENT DOCUMENTS

| | | | |
|---|---|---|---|
| 3,166,548 A | 1/1965 | Kirkpatrick et al. | |
| 3,539,518 A | 11/1970 | Feighner et al. | |
| 3,600,121 A | 8/1971 | Feldmann | |
| 3,676,344 A | 7/1972 | Kuceski | |
| 3,723,393 A | 3/1973 | Kistner | |
| 3,728,277 A | 4/1973 | Foley | |
| 4,368,276 A | 1/1983 | Park | |
| 4,374,737 A | 2/1983 | Larson et al. | |
| 4,501,672 A | 2/1985 | Connell et al. | |
| 4,664,843 A | 5/1987 | Burba, III et al. | |
| 4,749,563 A | 6/1988 | Georgalas | |
| 4,766,153 A | 8/1988 | Casciani | |
| 4,776,966 A | 10/1988 | Baker | |
| 5,079,203 A | 1/1992 | Pinnavaia et al. | |
| 5,094,778 A | 3/1992 | Burba, III et al. | |
| 5,196,143 A | 3/1993 | Burba, III et al. | |
| 5,250,727 A | 10/1993 | Fried | |
| 5,325,922 A | 7/1994 | Cowan et al. | |
| 5,709,976 A | 1/1998 | Malhotra | |
| 5,869,433 A | 2/1999 | Patel | |
| 5,874,024 A | 2/1999 | Knaus | |
| 6,172,151 B1 | 1/2001 | Johnston et al. | |
| 6,242,389 B1 | 6/2001 | Elliott et al. | |
| 6,365,639 B1 | 4/2002 | Hoy | |
| 6,395,686 B2 | 5/2002 | Crawford | |
| 6,437,031 B1 | 8/2002 | Lensvelt et al. | |
| 6,475,959 B1 | 11/2002 | Lange et al. | |
| 6,537,662 B1 | 3/2003 | Kamrath et al. | |
| 6,878,198 B1 | 4/2005 | Drappel et al. | |
| 6,894,007 B2 | 5/2005 | Klug et al. | |
| 7,098,351 B2 | 8/2006 | Hoong et al. | |
| 7,278,726 B2 | 10/2007 | Nagai | |
| 7,507,694 B2 | 3/2009 | Shumway et al. | |
| 7,741,248 B2 | 6/2010 | Mueller et al. | |
| 8,071,510 B2 | 12/2011 | Scoggins et al. | |
| 8,501,807 B2 | 8/2013 | You et al. | |
| 9,222,013 B1 | 12/2015 | Champagne et al. | |
| 9,315,621 B2 | 4/2016 | Chen et al. | |
| 9,815,222 B2 | 11/2017 | James et al. | |
| 2002/0009564 A1 | 1/2002 | Hall et al. | |
| 2002/0039666 A1 | 4/2002 | Nakamura | |
| 2003/0009834 A1 | 1/2003 | Ascione et al. | |
| 2003/0130132 A1 | 7/2003 | Grainger et al. | |
| 2003/0130135 A1 | 7/2003 | Hou et al. | |
| 2004/0038892 A1 | 2/2004 | Finn et al. | |
| 2005/0048024 A1 | 3/2005 | Looker et al. | |
| 2006/0035999 A1 | 2/2006 | Bedford et al. | |
| 2006/0068086 A1 | 3/2006 | Reece et al. | |
| 2006/0088657 A1 | 4/2006 | Reece et al. | |
| 2006/0293192 A1 | 12/2006 | Lochel et al. | |
| 2007/0034825 A1 | 2/2007 | Wenderoth et al. | |
| 2007/0049500 A1 | 3/2007 | Mueller et al. | |
| 2007/0100040 A1 | 5/2007 | Chen et al. | |
| 2007/0116909 A1 | 5/2007 | Tweed et al. | |
| 2007/0140957 A1 | 6/2007 | Mohanty et al. | |
| 2007/0227404 A1 | 10/2007 | Plank et al. | |
| 2007/0265171 A1 | 11/2007 | Javora et al. | |
| 2008/0170978 A1 | 7/2008 | Duan et al. | |
| 2008/0182468 A1 | 7/2008 | Dharmarajan et al. | |
| 2010/0056647 A1 | 3/2010 | Graham et al. | |
| 2010/0279848 A1 | 11/2010 | Iyi et al. | |
| 2011/0076607 A1 | 3/2011 | Sugimoto et al. | |
| 2012/0067575 A1 | 3/2012 | Luyster et al. | |
| 2012/0129735 A1 | 5/2012 | Dino et al. | |
| 2012/0322694 A1 | 12/2012 | Monteiro et al. | |
| 2012/0325748 A1 | 12/2012 | Kasher et al. | |
| 2013/0035412 A1 | 2/2013 | Schmitz et al. | |
| 2013/0045898 A1* | 2/2013 | Witters | A61K 8/046 507/202 |
| 2013/0267445 A1 | 10/2013 | Hendrickson | |
| 2014/0081045 A1 | 3/2014 | Reddington et al. | |
| 2014/0121135 A1 | 5/2014 | Gamage et al. | |
| 2014/0228269 A1 | 8/2014 | Masui et al. | |
| 2014/0231145 A1 | 8/2014 | Kverel et al. | |
| 2014/0255378 A1 | 9/2014 | Watkins et al. | |
| 2014/0284057 A1 | 9/2014 | Champagne et al. | |
| 2014/0329088 A1 | 11/2014 | Friedman et al. | |
| 2014/0338911 A1 | 11/2014 | Dismuke et al. | |
| 2015/0068755 A1 | 3/2015 | Hill et al. | |
| 2015/0175880 A1 | 6/2015 | Parris et al. | |
| 2015/0210914 A1 | 7/2015 | Muller et al. | |
| 2015/0361325 A1 | 12/2015 | Kimura et al. | |
| 2015/0376490 A1 | 12/2015 | Dino et al. | |
| 2016/0031910 A1 | 2/2016 | Maury et al. | |
| 2016/0096989 A1 | 4/2016 | Ngantung et al. | |
| 2016/0138349 A1 | 5/2016 | Hale et al. | |
| 2017/0037296 A1 | 2/2017 | Kimura et al. | |
| 2017/0044421 A1 | 2/2017 | Parvulescu et al. | |
| 2017/0081580 A1 | 3/2017 | Maghrabi et al. | |
| 2019/0053993 A1* | 2/2019 | Wilson | A61K 8/442 |
| 2019/0055446 A1 | 2/2019 | Al Batal et al. | |
| 2019/0055447 A1 | 2/2019 | Al Batal et al. | |
| 2019/0055460 A1* | 2/2019 | Mohammed | C09K 8/36 |

FOREIGN PATENT DOCUMENTS

| | | |
|---|---|---|
| CN | 105623629 A | 6/2016 |
| EP | 0047370 A1 | 3/1982 |
| EP | 396983 A1 | 11/1990 |
| EP | 839850 A2 | 5/1998 |
| EP | 0906969 A1 | 9/1998 |
| EP | 945244 A1 | 9/1999 |
| JP | H022848 A | 1/1990 |
| RU | 2231534 C2 | 6/2004 |
| WO | 9523823 A1 | 9/1995 |
| WO | 0012458 A1 | 3/2000 |
| WO | 01/49406 A1 | 7/2001 |
| WO | 2004069240 A2 | 8/2004 |
| WO | 2014052510 A1 | 4/2014 |
| WO | 2014102602 A2 | 7/2014 |
| WO | 2015174974 A1 | 11/2015 |
| WO | 2016141968 A1 | 9/2016 |
| WO | 2017055789 A2 | 4/2017 |

OTHER PUBLICATIONS

Search Report pertaining to International Patent Application PCT/US2018/046009 dated Oct. 31, 2018.

Search Report pertaining to International Patent Application PCT/US2018/045569 dated Oct. 25, 2018.

Search Report pertaining to International Patent Application PCT/US2018/045907 dated Nov. 27, 2018.

Costantino U. et al. "Preparation and characterization of hydrotalcite/carboxyadamantane intercalation compounds as fillers of polymeric nanocomposites" Journal of Materials Chemistry, Dec. 22, 2006, pp. 1079-1086, vol. 17, No. 11.

International Search Report and Written Opinion pertaining to International Patent Application PCT/US2018/046220 dated Nov. 27, 2018.

International Search Report and Written Opinion dated Dec. 20, 2018 pertaining to International Patent Application PCT/US2018/046226.

International Search Report and Written Opinion dated Oct. 24, 2018 pertaining to International Patent Application PCT/US2018/045765.

Office Action dated Sep. 20, 2019 pertaining to U.S. Appl. No. 16/055,881, filed Aug. 6, 2018, 28 pgs.

Office Action dated Sep. 20, 2019 pertaining to U.S. Appl. No. 16/055,867, filed Aug. 6, 2018, 28 pgs.

Office Action dated Sep. 19, 2019 pertaining to U.S. Appl. No. 16/059,558, filed Aug. 9, 2018, 28 pgs.

Office Action dated Sep. 19, 2019 pertaining to U.S. Appl. No. 16/059,550, filed Aug. 9, 2018, 29 pgs.

Abdo, et al., "Clay nanoparticles modified drilling fluids for drilling of deep hydrocarbon wells", Applied Clay Science, vol. 86, pp. 76-82, 2013.

Abdou, et al., "Evaluation of Egyptian bentonite and nano-bentonite as drilling mud", Egyptian Journal of Petroleum, vol. 22, pp. 53-59, 2013.

(56) References Cited

OTHER PUBLICATIONS

Al-Salihi, "Synthesis of layered double hydroxide and their application in DSC", International Journal of Scientific & Engineering Research, vol. 7, Issue 1, pp. 694-698, Jan. 2016.
Askinadze et al., "Engineering of new crosslinked functional PEG micrometer-sized particles of narrow size distribution for enzyme immobilization", Polymer 54, pp. 2926-2934, 2013.
Ayawei et al., "Synthesis, Characterization and Application of Mg/Al Layered Double Hydroxide for the Degration of Congo Red in Aqueous Solution", Open Journal of Physical Chemistry, vol. 5, pp. 55-70, 2015.
Baruah et al., "The effect of particle size of clay on the viscosity build up property of mixed metal hydroxides (MMH) in the low solid-drilling mud compositions", Applied Clay Science, 80-81, pp. 169-175, 2013.
Dardir et al., "Preparton and evaluation of some esteramides as synthetic based drilling fluids", Egyptian Journal of Petroleum, vol. 23, pp. 35-43, 2014.
Dyer et al., "Synthesis and Structure of Phophatidylinositol Dimannoside", J. Org. Chem., vol. 72, pp. 3282-3288, 2007.
Eissa et al., "Synthesis of nonionic polymeric surfactants with amide oxime terminal groups", Journal of Basic and Environmental Sciences 4, pp. 94-106, 2017.
Fruijtier-Polloth, "Safety assessment on polyethylene glycols (PEGs) and their derivatives as used in cosmetic products", Toxicology 214, pp. 1-38, 2005.
Gluz et al., "Synthesis and characterization of new poly(ethylene glycol)bisphosphonate vinylic monomer and non-fluorescent and NIR-fluorescent bisphosphonate micrometer-sized particles", Polymer 54, pp. 565-571, 2013.
Growcock et al., "The Revolution in Non-Aqueous Drilling Fluids", AADE-11-NTCE-33, presentation at the 2011 AADE National Technical Conference and Exhibition, 2011.
Hermoso, et al., "Influence of viscosity modifier nature and concentratio non the viscous flow behaviour of oil-based drilling fludis at high pressure", Applied Clay Science 87, pp. 14-21, 2014.
Li, et al., "A new type of whole oil-based drilling fluid", Petroleum Exploration and Development, vol. 41, Issue 4, Aug. 2014.
Kim et al., "Thermal Evolution of the Structure of a Mg-Al-Co3 Layered Double Hydroxide: Sorption Reversibility Aspects", Ind. Eng. Chem. Res, vol. 43, pp. 4559-4570, 2004.
Krauss, et al., "Synthesis and Biological Evaluation of New Niphathesine Analogues", Arch. Pharm. Chem. Life Sci., 340, pp. 154-158, 2007.
Li, et al., "Rheological properties of hydrotalcite-like compounds/ montmorillonite suspensions", Colloids and Surfaces A: Physichochem. Eng. Aspects, 304, pp. 14-17, 2007.
Liyi et al., "Effect of Gas Hydrate Drilling Fluids Using Low Solid Phase Mud System in Plateau Permafrost", Procedia Engineering 73, pp. 318-325, 2014.
Mao et al., "Hydrophobic associated polymer based silica nanoparticles composite with core-shell structure as a filtrate reducer for drilling fluid at ultra-high temperature", Journal of Petroleum Science and Engineering 129, pp. 1-14, 2015.
Mizrahi et al., "Novel Poly(ethylene glycol) Monomers Bearing Diverse Functional Groups", j. Polym. Sci., Part A: Polym. Chem. 48, pp. 5468-5478, 2010.
Ning et al., "Gas-hydrate formation, agglomeration and inhibition in oil-based drilling fluids for deep-water drilling", Journal of Natural Gas Chemistry 19, pp. 234-240, 2010.
Pivnicka et al., "Pressure gradient prediction of time-dependent drilling fluids and the effect of acceleration", Journal of Petroleum Science and Engineering 135, pp. 246-252, 2015.
Sakai et al., "Quaternary Ammonium-Type Gemini Surfactants Synthesized from Oleic Acid: Aqueous Solution Properties and Adsorption Characteristics", Journal of Oleo Science, vol. 62, No. 7, pp. 489-498, 2013.
Strachan, "Developing a High-Performance Oil-Base Fluid for Exploration Drilling", Oilfield Review Spring, vol. 26, No. 1, pp. 26-33, 2014.

Stanimirova et al., "Thermal evolution of Mg-Al-CO3 hydrotalcites", Clay Materials, vol. 39, pp. 177-191, 2004.
Tang, Boric Acid Catalyzed Amide Formation From Carboxylic Acids and Amines: N-Benzyl-4-Phenylbutyramide (Benzenbutanamide, N-(phenylmethyl)-), Organic Syntheses, vol. 81, pp. 262-272, 2005.
Traverso-Soto et al., "Distribution of anionic and nonionic surfactants in a sewage-impacted Mediterranean costal lagoon: Inputs and seasonal variations", Science of the Total Environment 503-504, pp. 87-96, 2015.
Vandevoorde et al., "Modifications of the Ethanolamine Head in N-Palmitoylethanolamine: Synthesis and Evaluation of New Agents Interfering with the Metabolism of Anandamide", J. Med. Chem. 46, pp. 1440-1448, 2003.
Vinardell et al., "The relationship between the chain length of non-ionic surfactants and their hemolytic action on human erythrocytes", Comparative Biochemistry and Physiology Part C 124, pp. 117-120, 1999.
Veronese et al., "The Impact of PEGylation of Biological Therapies", Buidrugs, vol. 22, Issue 5, pp. 315-329, 2008.
Wang et al., "New synthetic route to Mg-Al-CO3 layered double hydroxide using magnesite", Materials Research Bulletin 48, pp. 1228-1232, 2013.
Ying, "Fate, behavior and effects of surfactants and their degration products in the environment", Environment International 32, pp. 417-431, 2006.
Yldrim, "Metallic magnesium: an efficient catalyst toward N-aryl and N-alkyl substituted amides directly from aliphatic carboxylic acids", Monatsch Chem 146, pp. 947-951, 2015.
Zamanian et al., "Layered double hydroxides intercalated by long chain anions as oil phase gelling agent", Indian Journal of Chemical Technology, vol. 23, pp. 485-490, Nov. 2016.
Zhong et al., "Synergistic stabilization of shale by a mixture of polyamidoamine dendrimers modified bentonite with various generations in water-based drilling fluid", Applied Clay Science 114, pp. 359-369, 2015.
Zhuang et al., "Comparative study on the use of cationic-nonionic-organo-montmorillonite in oil-based drilling fluids", Applied Clay Science 1160117, pp. 257-262, 2015.
Search Report pertaining to International Patent Application PCT/US2018/045927 dated Oct. 30, 2018.
Office Action dated Mar. 16, 2020 pertaining to U.S. Appl. No. 16/100,836, filed Aug. 10, 2018, 11 pgs.
Office Action dated Mar. 19, 2020 pertaining to U.S. Appl. No. 16/055,890, filed Aug. 6, 2018, 38 pgs.
Examination Report pertaining to GCC Application No. 2018-35833 dated Apr. 20, 2020, 4 pgs.
Examination Report dated Feb. 17, 2020 pertaining to GCC Application No. 2018-35842, filed Aug. 14, 2018, 4 pgs.
Examination Report dated Feb. 5, 2020 pertaining to GCC Application No. 2018-35843, filed Aug. 14, 2018, 3 pgs.
Office Action dated Dec. 31, 2019 pertaining to U.S. Appl. No. 16/057,367, filed Aug. 7, 2018, 39 pgs.
Liang, et al. "Direct Synthesis of Unilamellar MgAl-LDH Nanosheets and Stacking in Aqueous Solution" Langmuir 2015, 31, 45, 12464-12471: (Year: 2015).
Constantino, et al. "Basis Properties of Mg2+1-x layered Double Hydroxides Intercalated by Carbonate, Hydroxide, Chloride and Sulfate Anions" (Year: 1994).
Notice of Allowance and Fee(s) Due dated Jan. 31, 2020 pertaining to U.S. Appl. No. 16/055,881, filed Aug. 6, 2018, 12 pgs.
Notice of Allowance and Fee(s) Due dated Jan. 17, 2020 pertaining to U.S. Appl. No. 16/059,550, filed Aug. 9, 2018, 11 pgs.
Notice of Allowance and Fee(s) Due dated Jan. 17, 2020 pertaining to U.S. Appl. No. 16/059,558, filed Aug. 9, 2018, 11 pgs.
Notice of Allowance and Fee(s) Due dated Jan. 17, 2020 pertaining to U.S. Appl. No. 16/059,867, filed Aug. 6, 2018, 9 pgs.
Office Action dated Feb. 3, 2020 pertaining to U.S. Appl. No. 16/057,378, filed Aug. 7, 2018, 10 pgs.
Notice of Allowance and Fee(s) Due dated Jun. 4, 2020 pertaining to U.S. Appl. No. 16/057,378, filed Aug. 7, 2018, 37 pgs.
Notice of Allowance and Fee(s) Due dated Apr. 15, 2020 pertaining to U.S. Appl. No. 16/059,558, filed Aug. 9, 2018, 17 pgs.

(56) References Cited

OTHER PUBLICATIONS

Examination Report dated Dec. 28, 2019 pertaining to GCC Application No. 2018-35835, filed Aug. 14, 2018, 3 pgs.
Office Action dated Jul. 10, 2020 pertaining to U.S. Appl. No. 16/057,367, filed Aug. 7, 2018, 57 pgs.
Notice of Allowance and Fee(s) Due dated Aug. 20, 2020 pertaining to U.S. Appl. No. 16/055,890, filed Aug. 6, 2018, 27 pgs.

* cited by examiner

THERMALLY STABLE SURFACTANTS FOR OIL BASED DRILLING FLUIDS

CROSS REFERENCE TO RELATED APPLICATIONS

This application claims the benefit of U.S. Provisional Application Ser. No. 62/545,799 filed Aug. 15, 2017.

TECHNICAL FIELD

Embodiments of the present disclosure generally relate to surfactants, and, specifically relate to the incorporation of the surfactants into oil based drilling fluids.

BACKGROUND

Synthetic surfactants are important organic compounds which are widely manufactured and have numerous applications. The world production of synthetic surfactants amounts to 7.2 million tons annually. Synthetic surfactants can be wetting agents having detergency and scouring characteristics. Wetting agents are adaptable when combined with other types of surfactants and can be resistant to hard water conditions. Nonionic surfactants represent approximately 40% of the total surfactant production worldwide and are used in commercial and household applications. Nonionic synthetic surfactants do not ionize, making them suitable ingredients in many mixtures and commercial products.

Drilling operations to drill a new wellbore for hydrocarbon extraction, for example, include the common practice of continuously circulating a drilling fluid (alternatively known as a drilling mud) through the wellbore during the drilling operation. The drilling fluid is pumped into the drill pipe to the bottom of the borehole where the drilling fluid then flows upwardly through the annular space between the wellbore wall and the drill pipe, and finally flows from the wellbore where it is recovered for secondary processing. Specifically, the drilling fluid is mechanically or chemically treated to remove captured solids and drill cuttings from the drilling fluid and before recirculating the drilling fluid back through the wellbore.

Given the circulating nature of drilling fluid and its functionality in capturing solids and cuttings during drilling operations, drilling fluids must be free-flowing with a relatively low viscosity in order to facilitate pumping while having sufficient substance to retain and transport the cuttings and other solids and to suspend the weight material so as to maintain a mud column of uniform density in the wellbore during static and circulating conditions. The drilling fluid must also have a gel strength sufficient to suspend the solids and cuttings if circulation of the drilling fluid is stopped to prevent accumulation of solids at the bottom of the wellbore. Solids accumulating at the bottom of the wellbore would potentially result in jamming of the drill as well as physical blockage of the drilling fluid's flow path.

Drilling in deep wells is complicated by geological conditions that involve high pressures and high temperatures (HPHT). The industry-defined definition of HPHT conditions typically include a wellbore temperature greater than 300 degrees Fahrenheit (° F.) (149 degrees Celsius (° C.)) and a wellbore pressure greater than 10,000 pounds per square inch (psi) (68.9 megapascals (MPa)).

SUMMARY

Thus, there are ongoing needs for drilling fluids and rheology modifiers for drilling fluids that are thermally stable under HPHT conditions and that have suitable rheological properties. Synthetic surfactants, when added to oil based drilling fluids, can enhance rheological properties, such as "fragile gel" properties and shear thinning behavior.

The drilling fluid would gel when the stress is removed, thereby supporting drill cuttings. However, the drilling fluid can easily deform to initiate circulation and are stable at high temperatures and high pressures, which can reduce the risk of formation damage, because "fragile gels" break more easily when circulation begins after a pause in drilling, thereby reducing surges in pressure.

Accordingly, some embodiments of this disclosure include a surfactant according to formula (I):

(I)

In formula (I), $R^{1a}$ is a —H, alkyl, or aryl; subscript x is an integer from 21 to 453; and $R^2$ is alkyl or aryl.

In one of more embodiments of this disclosure, an oil-based drilling fluid comprising: an oil phase, an aqueous phase, and at least one surfactant of formula (III):

(III)

In formula (II), $R^3$ is $(C_2$-$C_{500})$alkyl or aryl; and $R^{4a}$ is $(C_4$-$C_{500})$alkyl or $(C_4$-$C_{500})$heterohydrocarbyl.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

Specific embodiments of the surfactants and drilling fluids will now be described. It should be understood that the surfactant and the drilling fluids of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed in the following paragraph:

R and x: as defined in later paragraphs; Me: methyl; Et: ethyl; Ph: phenyl; Bn: benzyl; i-Pr: iso-propyl; t-Bu: tert-butyl; THF: tetrahydrofuran; Et$_2$O: diethyl ether; CH$_2$Cl$_2$ or DCM: dichloromethane; CCl$_4$: carbon tetrachloride; EtOH: ethanol; CH$_3$CN: acetonitrile; THF: tetrahydrofuran; CDCl$_3$: deuterated chloroform; Me$_4$Si or TMS: Tetramethylsilane; NaOH: sodium hydroxide; NaHCO$_3$: sodium bicarbonate; Na$_2$SO$_4$: sodium sulfate; MgSO$_4$: magnesium sulfate; HCl: hydrochloric acid; N$_2$: nitrogen gas; PhMe: toluene; GC: gas chromatography; LC: liquid chromatography; NMR: nuclear magnetic resonance; HRMS: high resolution mass spectrometry; mol: mole; mmol: millimoles; mL: milliliters; μL: microliters; M: molar; min: minutes; h: hours; d: days; g: grams; g/mol: grams per mole; wt. %: weight percent; nm: nanometers; μm: micrometers; mm: millimeters; s$^{-1}$: per second; ppm: parts per million.

When used to describe certain carbon atom-containing chemical groups a parenthetical expression having the form "(C$_x$-C$_y$)" means that the unsubstituted form of the chemical group has from x carbon atoms to y carbon atoms, inclusive of x and y. For example, a (C$_1$-C$_{40}$)alkyl is an alkyl group having from 1 to 40 carbon atoms in its unsubstituted form. In some embodiments and general structures, certain chemical groups may be substituted by one or more substituents such as R$^S$. An R$^S$ substituted version of a chemical group defined using the "(C$_x$-C$_y$)" parenthetical may contain more than y carbon atoms depending on the identity of any groups R$^S$. For example, a "(C$_1$-C$_{40}$)alkyl substituted with one group R$^S$, where R$^S$ is phenyl (—C$_6$H$_5$)" may contain from 7 to 46 carbon atoms. Thus, when the chemical group is substituted by one or more carbon atom-containing R$^S$ substituents, the minimum and maximum total number of carbon atoms of the chemical group is determined by adding to x and y, respectively, the combined sum of the number of carbon atoms from all of the carbon atom-containing substituents R$^S$.

The term "—H" means a hydrogen atom or hydrogen radical that is covalently bonded to another atom. "Hydrogen" and "—H" are interchangeable, and unless clearly specified mean the same thing.

The term "alkyl," means a saturated straight or branched chain, substituted or unsubstituted hydrocarbon radical having from 1 to 500 carbon atoms. The terms "(C$_1$-C$_{100}$)alkyl" and "(C$_1$-C$_{40}$)alkyl" mean an alkyl having from 1 to 100 or 1 to 40 carbon atoms that is unsubstituted or substituted by one or more R$^S$. Examples of unsubstituted (C$_1$-C$_{40}$)alkyl are unsubstituted (C$_1$-C$_{40}$)alkyl; unsubstituted (C$_1$-C$_{10}$)alkyl; unsubstituted (C$_1$-C$_5$)alkyl; methyl; ethyl; 1-propyl; 2-propyl (also called iso-propyl and 1-methylethyl); 1-butyl; 2-butyl; 2-methylpropyl; 1,1-dimethylethyl (also called tert-butyl); 1-pentyl; 1-hexyl; 1-heptyl; 1-nonyl; and 1-decyl. Examples of substituted (C$_1$-C$_{40}$)alkyl are substituted (C$_1$-C$_{20}$) alkyl, substituted (C$_1$-C$_{10}$)alkyl, and trifluoromethyl.

The term "aryl" means an unsubstituted or substituted mono-, bi- or tricyclic aromatic hydrocarbon radical having 6 to 500 carbon atoms, of which at least from 6 to 14 of the carbon atoms are aromatic ring carbon atoms. The term "(C$_6$-C$_{40}$)aryl" means an aryl having 6 to 40 or more than 6 carbon atoms that is unsubstituted or substituted by one or more R$^S$. The mono-, bi- or tricyclic radical comprises 1, 2 or 3 rings, respectively; in which the 1 ring is aromatic and the 2 or 3 rings independently are fused or non-fused and at least one of the 2 or 3 rings is aromatic.

The term "alkylene" means a saturated straight chain or branched chain diradical (that is the radicals are not on ring atoms) of 1 to 500 carbon atoms that is unsubstituted or substituted by one or more R$^S$. The term "(C$_1$-C$_{40}$)alkylene" means an alkylene having from 1 to 40 carbon atoms. Examples of unsubstituted (C$_1$-C$_{40}$)alkylene include —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$), in which "C*" denotes a carbon atom from which a hydrogen atom is removed to form a secondary or tertiary alkyl radical. Examples of substituted (C$_1$-C$_{40}$)alkylene are substituted (C$_1$-C$_{20}$)alkylene, —CF$_2$—, —C(O)—, and —(CH$_2$)$_{14}$C(CH$_2$H$_3$)$_2$(CH$_2$)$_5$— (i.e., a 6,6-dimethyl substituted normal-1,20-eicosylene).

The term "arylene" means an unsubstituted or substituted (by one or more R$^S$) mono-, bi- or tricyclic aromatic hydrocarbon diradical having 6 or more carbon atoms, of which at least from 6 to 14 of the carbon atoms are aromatic ring carbon atoms, and the mono-, bi- or tricyclic diradical comprises 1, 2 or 3 rings, respectively. When there is one ring, the one ring is aromatic, and when there are 2 or 3 rings, the 2 or 3 rings independently are fused or non-fused and at least one of the 2 or 3 rings is aromatic. Both radicals are located on the aromatic ring or rings. Examples of an aromatic hydrocarbon diradical, include, but are not limited to: —C$_6$H$_4$—, —(C$_6$H$_4$—C$_6$H$_4$)—, and —C$_{10}$H$_5$— (for example, a napthalene diradical).

The term "heteroatom" refers to an atom, other than carbon or hydrogen. The term "heterohydrocarbon" refers to a molecule, in which one or more carbon atoms are replaced with an atom or atoms that are not hydrogen or carbon atoms. The term "(C$_1$-C$_{40}$)heterohydrocarbyl" means a heterohydrocarbon radical of from 1 to 40 carbon atoms and the term "(C$_1$-C$_{40}$)heterohydrocarbylene" means a heterohydrocarbon diradical of from 1 to 40 carbon atoms, and each heterohydrocarbyl independently has one or more heteroatoms, for example O, S, S(O), S(O)$_2$, Si(R$^S$)$_2$, P(R$^S$), N(R$^S$), and —N=C(R$^S$).

Embodiments of this disclosure include surfactants according to formula (I).

(I)

In formula (I), R$^{1a}$ is a (C$_1$-C$_{40}$)alkyl or (C$_6$-C$_{40}$)aryl; subscript x is an integer from 21 to 453; R$^2$ is (C$_1$-C$_{40}$) hydrocarbyl or (C$_6$-C$_{40}$)aryl. In other embodiments, subscript x may range from 21 to 200, from 21 to 100, from 21 to 50, from 25 to 100, from 30 to 50, or from 30 to 40.

In other embodiments of the surfactant according to formula (I), R$^{1a}$ is a radical —CH$_2$—C(O)—NHR$^5$ and the surfactant has a structure according to formula (II):

(II)

In formula (II), $R^5$ can be an alkyl, aryl, alkyl substituted aryl, or aryl substituted alkyl; and $R^2$ is $(C_1-C_{40})$hydrocarbyl or $(C_6-C_{40})$aryl, and x is 21 to 453. In some embodiments of the surfactants according to formula (II), x is between 30 and 40, and $R^2$ and $R^5$ are independently a $(C_4-C_{12})$alkyl chosen from methyl, ethyl, 1-methylethyl, propyl, n-butyl, 1,1-dimethylethyl, pentyl, hexyl, heptyl, octyl, nonyl, decyl, undecyl, duodecyl. In further embodiments, x is 32 and $R^2$ and $R^5$ are both n-octyl.

Some embodiments of this disclosure pertain to surfactants according to formula (III).

(III)

In formula (III), $R^3$ is alkyl, aryl, aryl substituted alkyl, or alkyl substituted aryl; and $R^{4a}$ is chosen from a $(C_3-C_{50})$ alkyl, a substituted alkyl, or $(C_4-C_{500})$heteroalkyl. In some embodiments, $R^{4a}$ is chosen from a propanyl, 2-propanyl, 1-butyl, tert-butyl (also called 1,1-dimethylethyl), 1-pentyl, hexyl, heptyl, octyl, or nonyl. In some embodiments, $R^{4a}$ is a substituted alkyl, in which the substituent, $R^S$, is $-NH_2$. In one or more embodiments, $R^3$ is a $(C_8-C_{50})$alkyl chosen from octyl, nonyl, decyl, undecyl, dodecyl, tridecyl, tetradecyl, pentadecyl, hexadecyl, heptadecyl, octadecyl, nonadecyl, nonadecyl, or icosanyl. In one embodiment, $R^3$ is pentadecyl and $R^{4a}$ is butyl.

In other embodiments of the surfactant according to formula (III), $R^{4a}$ is a radical $-R^{4b}-NH_2$ and the surfactant has a structure according to formula (IV):

(IV)

In formula (IV), $R^3$ is alkyl, aryl, aryl substituted alkyl, or alkyl substituted aryl, and $R^{4b}$ is $(C_4-C_{100})$alkylene or arylene. In one or more embodiments, $R^{4b}$ is chosen from $-CH_2CH_2CH_2-$, $-CH_2CH_2CH_2CH_2-$, $-CH_2CH_2CH_2CH_2CH_2-$, $-CH_2(CH_2)_4CH_2-$, $-CH_2(CH_2)_5CH_2-$, $-CH_2(CH_2)_6CH_2-$, or $-CH_2(CH_2)_7CH_2-$.

Accordingly, some embodiments of this disclosure include surfactants according to formula (V):

(V)

In formula (V), $R^{1b}$ is a $-H$, $(C_1-C_{40})$alkyl, $(C_6-C_{40})$aryl, or $(C_1-C_{40})$heterocarbyl, and subscript x is an integer from 21 to 453. In some embodiments, subscript x may be from 21 to 200, from 21 to 100, from 21 to 50, from 25 to 100, from 30 to 50, or from 30 to 40.

Some embodiments of the surfactants according to formula (V) include embodiments in which $R^{1b}$ is a linear or branched $(C_1-C_{12})$alkyl chosen from methyl, ethyl, 1-methylethyl, propyl, butyl, 1,1-dimethylethyl, pentyl, hexyl, heptyl, octyl, nonyl, decyl, undecyl, duodecyl.

In other embodiments, the surfactants according to formula (V) include embodiments in which $R^{1b}$ is a radical $-CH_2COOH$, and the surfactant has a structure according to formula (VI):

(VI)

In formulas (V) and (VI), subscript x may be from 21 to 453, from 21 to 200, from 21 to 100, from 21 to 50, from 25 to 200, and from 30 to 200; in other embodiments, subscript x may be from 25 to 100 and from 30 to 50; and in further embodiments, subscript x may be from 30 to 40.

In some embodiments, each of the chemical groups (such as $R^{1b}$, $R^2$, $R^3$, $R^{4a}$, $R^{4b}$, and $R^5$) of the surfactant according to formulas (I), (II), (III), (IV), and (V) may be unsubstituted, that is, can be defined without use of a substituent $R^S$, provided the above-mentioned conditions are satisfied. In other embodiments, at least one of the chemical groups of the surfactant according to formula (I) independently contain one or more of the substituents $R^S$. In most embodiments, there are not more than a total of 20 $R^S$, and in other embodiments, not more than a total of 10 $R^S$, and in some embodiments, not more than a total of 5 $R^S$ in the surfactant according to formula (I). Where the surfactant contains two or more substituents $R^S$, each $R^S$ independently is bonded to a same or different substituted chemical group. When two or more $R^S$ are bonded to a same chemical group, they independently are bonded to a same or different carbon atom or heteroatom in the same chemical group up to and including persubstitution of the chemical group.

In specific embodiments of the surfactant according to formulas (I), (II), (III), (V) and (VI) may include, without limitation, a structure of any surfactants 1-5:

Surfactant 5

Embodiments of the surfactants described in this disclosure may additionally function as wetting agents. The wetting agent or surfactant may be added to an oil-based drilling fluid composition thereby enhancing the stability of suspensions or emulsions.

Drilling fluids include drilling muds, packer fluids, suspension fluids and completion fluids. Generically, drilling fluids serve a number of functions, with the different types of fluids specializing in a particular function or functions. In one or more embodiments, the oil-based drilling fluid suspends the cuttings and weighted material and transports the cutting to the wellbore surface with the oil-based drilling fluid. Additionally, the oil-based drilling fluid may absorb gases in a wellbore, such as carbon dioxide ($CO_2$), hydrogen sulfide ($H_2S$), and methane ($CH_4$), and transport them to the wellbore surface for release, sequestration, or burn-off. The oil-based drilling fluids additionally may provide buoyancy to the drill string, relieving the tension on the drill string as the length of the wellbore increases. In one or more embodiments, the oil-based drilling fluid also provides a cooling and lubrication functionality for cooling and lubrication of the bit and drill string utilized in boring operations. In other embodiments, the oil-based drilling fluid may control subsurface pressures. Specifically, the oil-based drilling fluid may provide hydrostatic pressure in the wellbore to provide support to the sidewalls of the wellbore and prevent the sidewalls from collapsing or caving in on the drill string. Additionally, the oil-based drilling fluid may provide hydrostatic pressure in the wellbore to prevent fluids in the downhole formations from flowing into the wellbore during drilling operations.

A drilling fluid utilized in a high pressure and high temperature (HPHT) operations may experience a wellbore temperature greater than 300° F. (149° C.) and a wellbore pressure greater than 10,000 psi (68.9 MPa) which is the industry-defined definition of HPHT conditions. Under HPHT conditions, drilling fluids may decompose or experience undesirable changes in rheology. Oil-based fluids according to various embodiments in this specification are described that have rheological properties, electrical stability after hot rolling, gel strength, and reduced fluid-loss characteristics at 350° F. and pressure of 500 psi that render the oil-based drilling fluids suitable for use in HPHT conditions in wellbore operations. The oil-based fluids contain a polyethylene glycol carboxylic acid compound as a wetting agent. Methods for preparing the oil-based fluids, therefore, include adding the polyethylene glycol carboxylic acid compound during a mixing procedure. Methods for drilling in a subterranean formation under high-pressure high-temperature conditions include using the oil-based drilling fluids containing the polyethylene glycol carboxylic acid compound wetting agent.

Oil-based drilling fluids according to various embodiments may contain a base oil phase, an aqueous phase, at least one emulsifying agent and at least one wetting agent, in which at least one wetting agent comprises a polyethylene glycol carboxylic acid having 10 or more glycol repeating units or 11 or more glycol repeating units. The 10 or more glycol repeating units in the surfactant stabilizes the surfactant at high temperatures, and surfactants that are thermally stable at high temperatures can be added to drilling muds for high temperature high pressure applications.

The term "glycol repeating units" means $-CHR^SCHR^SO-$ or $-OCHR^SCHR^S-$, in which $R^S$ is previously defined or $-H$. In formulas (I)-(VI), the glycol repeating units is shown as $-(CH_2CH_2O)_x-$ or $-(OCH_2CH_2)_x-$, in which subscript x is previously defined, and the number of glycol repeating units may be defined by x.

The oil phase of the oil-based drilling fluids may include a synthetic oil or natural petroleum product. The synthetic oil may comprise an ester or olefin. The natural petroleum-derived product includes oils such as a diesel oil or a mineral oil. The synthetic oil or natural petroleum product may be composed of hydrocarbons such as n-paraffins, iso-paraffins, cyclic alkanes, branched alkanes, or mixtures thereof. The oil-based drilling fluid may contain from approximately 10.0 wt. % to 20.0 wt. % base oil, based on the total weight of the oil-based drilling fluid. In a further embodiment, the oil-based drilling fluid may contain from approximately 13.0 wt. % to 17.0 wt. % base oil, based on the total weight of the oil-based drilling fluid.

As noted previously, the wetting agent includes a surfactant having a polyethylene glycol carboxylic acid having: 10 or more than 10 glycol repeating units; or 11 or more than 11 glycol repeating units. In some embodiments, the wetting agent may comprise a polyethylene glycol carboxylic acid surfactant according to formula (V):

In formula (IV), $R^{1b}$ can be a $-H$, alkyl, aryl, alkyl substituted aryl, or aryl substituted alkyl; and x is an integer from 10 to 453. In other embodiments, subscript x is from 11 to 453, from 15 to 453, from 20 to 400, from 25 to 300, from 30 to 250, or from 33 to 100. In some embodiments, the number of glycol repeating units is defined by x. In some embodiments, $R^{1b}$ is a radical $-CH_2COOH$ and the surfactant has a structure according to formula (VI):

In formula (VI), x can be from 21 to 200, from 25 to 200, from 27 to 150, from 29 to 100, or from 30 to 75. In one embodiment, x is 32.

Additionally, the wetting agent may include a surfactant of formula (III):

In formula (III), $R^3$ is $(C_2\text{-}C_{500})$alkyl or aryl; and $R^{4a}$ is $(C_4\text{-}C_{500})$hydrocarbyl or $(C_4\text{-}C_{500})$heterohydrocarbyl. In some embodiments, $R^3$ is a linear, non-branching alkyl, having 15 carbons; and $R^{4a}$ is n-butyl.

In one or more embodiments, the wetting agent in the oil-based drilling fluid may include a surfactant of formula (III), where $R^{4a}$ is a radical —$R^{4b}$—$NH_2$ and the surfactant has a structure according to formula (IV):

(IV)

In formula (IV), $R^3$ is $(C_2\text{-}C_{500})$alkyl or aryl; and $R^4$ is $(C_4\text{-}C_{500})$alkylene or arylene. In one or more embodiments, $R^{4b}$ is chosen from —$CH_2CH_2CH_2$—, —$CH_2CH_2CH_2CH_2$—, —$CH_2CH_2CH_2CH_2CH_2$—, —$CH_2(CH_2)_4CH_2$—, —$CH_2(CH_2)_5CH_2$—, —$CH_2(CH_2)_6CH_2$—, or —$CH_2(CH_2)_7CH_2$—.

The oil-based drilling fluids optionally may include one or more emulsifiers that facilitate formation of an emulsion and reduce interfacial tension between the base oil phase of the oil-based drilling fluid and the aqueous phase of the oil-based drilling fluid. Examples of emulsifiers include surfactants, detergents, lignosulfates, and lignitic compounds. Additional example emulsifiers include an invert emulsifier and oil-wetting agent for synthetic based drilling fluid systems such as LE SUPERMUL™ commercially available from Halliburton Energy Services, Inc. and MUL XT commercially available from M-I SWACO.

The aqueous phase of the oil-based drilling fluid may be any suitable fluid such as water or a solution containing both water and one or more organic or inorganic compounds dissolved in the water or otherwise completely miscible with the water. In some embodiments, the aqueous phase may be composed of salt brine made up of water and a salt chosen from calcium chloride, calcium bromide, sodium chloride, sodium bromide, and combinations thereof, for example. The oil-based drilling fluid may contain from approximately 3.0 wt. % to approximately 6.0 wt. % aqueous phase, based on the total weight of the oil-based drilling fluid. The oil-to-water ratio of the oil-based drilling fluid composition is the volumetric ratio calculated as Oil:water=base oil+surfactant(s)+emulsifier(s)+wetting agent(s): water. Where "water" includes the aqueous part of all brines added plus any water present in other additives.

The oil-based drilling fluid optionally may include a fluid-loss control that reduces the amount of filtrate lost from the drilling fluid into a subsurface formation. Examples of fluid-loss control agents include organophilic (for example, amine-treated) lignite, bentonite, manufactured polymers, and thinners or deflocculants. Additional examples of fluid-loss control agents include: VERSATROL™, VERSALIG™, ECOTROL™ RD, ONETROL™ HT, EMI 789, and NOVATECH™ F, all commercially available from MI SWACO, Houston, Tex., U.S.A.; and ADAPTA® which is commercially available from Halliburton Energy Services, Inc. In some embodiments, the oil-based drilling fluid may optionally include both ONETROL™ HT and ECOTROL™ RD. In some embodiments, when fluid-loss control agents are included in the oil-based drilling fluid, the total amount of fluid-loss control agents may be from approximately 0.5 wt. % to approximately 3.0 wt. % of the oil-based drilling fluid, based on the total weight of the drilling fluid. In other embodiments, the oil-based drilling fluid may include from 0.9 wt. % to 2.0 wt. % or from 1.0 wt. % to 1.5 wt. %.

Embodiments of the oil-based drilling fluid composition are formulated to provide improved rheology. Suspending agents optionally may be added to the oil-based drilling fluid that adjusts the viscosity of the drilling fluid to have a yield point at a low shear rate sufficient to suspend all of the drilling fluid components, by which the settling of components of the drilling fluid may be avoided. Low shear rate can be defined as below 10 $s^{-1}$, whereas high shear rate can be defined as greater than 100 $s^{-1}$. The greater viscosity at low shear rates enables the oil-based drilling fluid composition to effectively hold cuttings when drilling operations are halted and to suspend the weight material. Examples of suspending agents include fatty acids and fibrous materials. When suspending agents are used, they may compose from approximately 0.0 wt. % to approximately 1.0 wt. % or 0.01 to 0.5 wt. % of the oil-based drilling fluid, based on the total weight of the drilling fluid.

In some embodiments, the oil-based drilling fluid optionally may include weighting material or density adjusting agents that increases the weight, the density, or both, of the oil-based drilling fluid. Weight adjusting agents may be used to control formation pressures and to help combat the effects of sloughing or heaving shales that may be encountered in stressed areas. Any substance that is denser than water and that does not adversely affect other properties of the drilling fluid can be used as a weighting material. Examples of weight adjusting or density adjusting agents include barite ($BaSO_4$), galena (PbS), hematite ($Fe_2O_3$), magnetite ($Fe_3O_4$), manufactured iron oxide, ilmenite ($FeO.TiO_2$), siderite ($FeCO_3$), celesite ($SrSO_4$), dolomite ($CaCO_3.MgCO_3$), and calcite ($CaCO_3$). In some embodiments, the oil-based drilling fluid composition may include from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting additive based on the total weight of the oil-based drilling fluid composition. In some embodiments, the oil-based drilling fluid composition may include from 64 wt. % to 85.3 wt. % weighting material based on the total weight of the oil-based drilling fluid composition. In general, the amount of optional weighting material in the oil-based drilling fluid is sufficiently great to attain a desirable density of the oil-based drilling fluid and is sufficiently small to avoid an oil-based drilling fluid that cannot be circulated through a wellbore.

In some embodiments, the oil-based drilling fluid may include a weighting material that has a particulate solid having a specific gravity (SG) that sufficiently increases the density of the drilling fluid composition by a certain amount without adding excessive weighting material such that the drilling fluid composition cannot be circulated through the wellbore. The weighting material may have a specific gravity of from 2 to 6. In other embodiments, the drilling fluid may have a specific gravity of from 0.9 to 2.3 or from 1.5 to 2.2.

Having previously described the oil-based drilling fluids according to various embodiments, illustrative methods for preparing the oil-based drilling fluids will now be described. In one or more embodiments, methods for preparing an oil-based drilling fluid include mixing an oil phase, optionally at least one emulsifier, and at least one wetting agent or surfactant, to form an oil base mixture. The at least one surfactant comprises a carboxylic acid having 10 or more glycol repeating units. Optionally, one or more rheology modifiers may be added.

Optionally, the methods for preparing the oil-based drilling fluids may include adding at least one fluid-loss control additive to the oil base mixture. The at least one fluid-loss control additive may be added to the oil base mixture in an amount that provides a final oil-based drilling fluid containing approximately 0.5 wt. % to approximately 3.0 wt. % of the oil-based drilling fluid or from 0.9 wt. % to 2.0 wt. % or from 1.0 wt. % to 1.5 wt. % fluid-loss control additive, based on the total weight of the oil-based drilling fluid.

In some embodiments, the methods for preparing the oil-based drilling fluids may include adding a brine solution to the oil base mixture to form a second mixture. The brine solution may be added to the oil base mixture in an amount that provides a final oil-based drilling fluid containing from approximately 1.0 wt. % to approximately 10.0 wt. % brine, based on the total weight of the oil-based drilling fluid.

In one or more embodiments, the methods for preparing the oil-based drilling fluids may include adding a weighting material to the second mixture to form the oil-based drilling fluid. The weighting material may be added to the fourth mixture in an amount that provides to a final oil-based drilling fluid containing from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting material based on the total weight of the oil-based drilling fluid.

The oil-based drilling fluids previously described, including oil-based drilling fluids prepared according to embodiments of methods for preparing oil-based drilling fluids in this disclosure, as well as oil-based drilling fluids according to embodiments of this disclosure but prepared by other industry-acceptable techniques understood by the person of ordinary skill, may be well-suited for use in drilling operations in subterranean formations, particularly for drilling operations performed under HPHT conditions of a wellbore pressure greater than 10,000 psi and a wellbore temperature greater than 300° F. (149° C.). Accordingly, embodiments of methods for drilling in a subterranean formation under high-pressure high-temperature conditions may include using the oil-based drilling fluid for the drilling of a wellbore in a subterranean formation.

In the methods for drilling in a subterranean formation, the oil-based drilling fluid includes a surfactant as a wetting agent—the surfactant includes a polyethylene glycol carboxylic acid having 10 or more repeating glycol units. Under high-pressure high-temperature conditions, which includes temperature from 250° F. (120° C.) to 400° F. (205° C.) and pressures from 10,000 pound-force per square inch (psi) to 20,000 psi, the oil-based drilling fluid may have a lower viscosity than the viscosity of a comparative drilling fluid would have at the same conditions. As used herein, a "comparative drilling fluid" is a drilling fluid having all the same ingredients as the oil-based drilling fluid in weight proportions to each other identical to the weight proportions of the same ingredients to each other in the oil-based drilling fluid, with the exceptions that (1) the comparative drilling fluid lacks the surfactant; and (2) one or both of the amount of base oil or the amount of weighting agent in the comparative drilling fluid is adjusted so that the comparative drilling fluid has a specific gravity that matches the specific gravity of the oil-based drilling fluid and an oil-to-water ratio that matches the oil-to-water ratio of the oil-based drilling fluid.

EXAMPLES

The following examples illustrate one or more additional features of the present disclosure described previously. It should be understood that these examples are not intended to limit the scope of the disclosure or the appended claims in any manner.

Experimental Procedures

The chemicals were used without further purification unless noted otherwise. Tetrahydrofuran (THF) was distilled prior to use. Nuclear Magnetic Resonance (NMR) spectra were recorded on a Varian-Mercury 500 MHz spectrometer, operating at ambient probe temperature. The chemical shifts δ are given in parts per million (ppm) and referenced to the external standard tetramethylsilane (TMS).

Example 1: General Procedures for Preparation of Polyethylene Glycol Amides According to Formula (IV)

Method $A_1$.

To a flask equipped with Dean-Stark trap topped with a reflux condenser palmitic acid (5 g, 19.49 mmol), boric acid (0.06 g, 0.97 mmol) and toluene (57 mL) were added. To the stirred reaction mixture, n-butyl amine (2.10 mL, 21.44 mmol) was added in one portion. The reaction mixture was heated overnight at reflux. The mixture was allowed to cool to room temperature and then was poured with stirring into hexane leading to the immediate precipitation of a solid, which was filtered off and washed with hexane to afford the desired amide (4.92 g, 15.79 mmol, 81%).

Method $B_1$.

Oxalyl chloride (3.59 ml) was added to a solution of palmitic acid (0.50 g, 1.94 mmol) in toluene (14 mL) and the mixture was refluxed for 4 h. The solvent was removed and the residue was dissolved in toluene (10 mL). Triethylamine (3.5 mL, 25 mmol) and n-butylamine (0.57 mL, 5.82 mmol) were added and the mixture was stirred at room temperature for 12 h. The solvent was removed and the residue was dissolved in 10% aq. HCl. The aqueous layer was extracted with $CH_2Cl_2$ and the organic layer was dried ($MgSO_4$), filtered and concentrated to afford the amide (0.43 g, 1.38 mmol, 70%).

$^1$H NMR (400 MHz, $CDCl_3$): δ=5.38 (s, 1H, NH), 3.25 (td, 2H, J=7.1, 5.8 Hz, $NHCH_2$), 2.17-2.12 (m, 2H, $CH_2CO$), 1.61 (p, 2H, J=7.4 Hz, $CH_2CH_2CO$), 1.51-1.44 (m, 2H, $NHCH_2CH_2$), 1.37-1.21 (m, 26H, $CH_3CH_2$, $CH_3(CH_2)_{12}$), 0.92 (t, 3H, J=7.3 Hz, $NH(CH_2)_3CH_3$), 0.89-0.85 (m, 3H, $CH_3(CH_2)_{14}$). $^{13}$C NMR (100 MHz, $CDCl_3$): δ=173.09 (CO), 39.21 ($NHCH_2$), 36.96 ($COCH_2$), 31.95 ($CH_2$), 31.81 ($CH_2$), 29.71 ($CH_2$), 29.71 ($CH_2$), 29.71 ($CH_2$), 29.71 ($CH_2$), 29.71 ($CH_2$), 29.67 ($CH_2$), 29.63 ($CH_2$), 29.51 ($CH_2$), 29.38 ($CH_2$), 29.33 ($CH_2$), 25.88 ($CH_2$), 22.71 ($CH_2$), 20.09 ($CH_2$), 14.16 ($CH_3$), 13.77 ($CH_3$).

Example 2: General Procedure for Preparation of Polyethylene Glycol Amides According to Formulas (I) and (II)

Polyethylene glycol N-octyl amide was prepared as described for amides according to formula (IV) (Method $B_1$) from polyethylene glycol carboxylic acid (0.2 g, 0.13 mmol) and N-octylamine (0.04 mL, 0.26 mmol) using oxalyl chloride (0.48 mL, 2.87 mmol) and triethylamine (0.55 mL, 3.92 mmol). Polyethylene glycol N-octyl amide was obtained in 73% yield (0.16 g, 0.09 mmol).

$^1$H NMR (400 MHz, CDCl$_3$): δ=8.06 (br, 2H, 2NH), 4.18 (s, 4H, 2CH$_2$CO), 3.67-3.65 (m, 128H, (CH$_2$CH$_2$O)$_{32}$), 2.99-2.95 (m, 4H, 2CH$_2$NH), 1.78-1.74 (m, 4H, 2CH$_2$CH$_2$NH), 1.34-1.22 (m, 20H, 2(CH$_2$)$_5$CH$_3$), 0.90-0.85 (m, 6H, 2CH$_2$CH$_3$). $^{13}$C NMR (100 MHz, CDCl$_3$): δ=172.30 (CO), 71.20 (COCH$_2$), 70.61 (OCH$_2$CH$_2$O), 40.16 (CH$_2$NH), 31.75 (CH$_2$), 29.08 (CH$_2$), 29.01 (CH$_2$), 27.67 (CH$_2$), 26.60 (CH$_2$), 22.61 (CH$_2$), 14.10 (CH$_3$).

Example 3: General Procedure for Preparation of Polyethylene Glycol Nonyl Ether

Sodium hydride (NaH) (0.062 g, 2.6 mmol) was added to a solution of polyethylene glycol (3 g, 2 mmol, 1500 g/mol) in THF (20 mL). After 30 minute of stirring at room temperature, nonyl bromide (0.45 mL, 2.4 mmol) was added slowly and the mixture was stirred at room temperature overnight. Methanol was added and the solvent was removed under reduced pressure and then the residue was dissolved in CH$_2$Cl$_2$. The organic layer was washed with water, dried with magnesium sulfate (MgSO$_4$), filtered, and concentrated under vacuum and the residue was dissolved in a minimum amount of CH$_2$Cl$_2$ and hexane was added under stirring. The precipitate was recovered by filtration and washed with hexane affording the polyethylene glycol nonyl ether (2.82 g, 1.74 mmol, 87%).

$^1$H NMR (400 MHz, CDCl$_3$): δ=3.80-3.55 (m, 138H, (CH$_2$CH$_2$O)$_{34}$, CH$_2$CH$_2$OH), 3.50-3.35 (m, 4H, CH$_2$CH$_2$O, CH$_2$OH), 2.59-2.56 (m, 1H, OH), 1.57-1.32 (m, 4H, CH$_2$CH$_2$CH$_2$O), 1.28-1.24 (m, 10H, (CH$_2$)$_5$CH$_3$), 0.88-0.84 (m, 3H, CH$_2$CH$_3$).

Method A$_2$.

Tetrabutylammonium bromide (0.29 g, 0.92 mmol), polyethylene glycol nonyl ether (2.78 g, 1.71 mmol, 1626 g/mol) and potassium permanganate (2.16 g, 13.69 mmol) were refluxed in a mixture of CH$_2$Cl$_2$ (95 mL), acetic acid (3.8 mL) and water (56 L for 24 h. The solution was cooled and 1 M HCl (95 mL) was added followed by the addition of sodium sulphite (2.43 g). The aqueous phase was extracted with CH$_2$C$_{12}$. The combined organic extracts were dried over MgSO$_4$, filtered and the solvent was removed. The residue was dissolved in a minimum amount of CH$_2$Cl$_2$ and hexane was added under stirring. The precipitate was recovered by filtration and washed with hexane affording a surfactant according to formula (V) (2.60 g, 1.58 mmol, 93%).

Method B$_2$.

Polyethylene glycol nonyl ether (0.75 g, 0.46 mmol, 1626 g/mol), 2,2,6,6-tetramethyl piperidine-1-oxyl (0.014 g, 0.09 mmol) and nitric acid (0.018 mL, 70%) were heated at 40° C. in dichloromethane (3.5 mL) for 12 hours under oxygen atmosphere. Water was added and the aqueous layer was extracted with dichloromethane. The organic extract was dried over MgSO$_4$, filtered and the solvent was removed to afford a surfactant according to formula (V) (0.73 g, 0.44 mmol, 97%).

$^1$H NMR (400 MHz, CDCl$_3$): δ=4.16 (s, 2H, CH$_2$CO), 3.67-3.64 (m, 132H, (CH$_2$CH$_2$O)$_{33}$), 3.46-3.42 (m, 2H, CH$_2$O), 1.62-1.53 (m, 4H, CH$_2$CH$_2$CH$_2$O), 1.36-1.20 (m, 10H, (CH$_2$)$_5$CH$_3$), 0.89-0.85 (m, 3H, CH$_2$CH$_3$). $^{13}$C NMR (100 MHz, CDCl$_3$): δ=171.56 (CO), 71.35 (COCH$_2$), 70.58 (OCH$_2$CH$_2$O), 69.04 (OCH$_2$CH$_2$), 31.90 (CH$_2$), 29.66 (CH$_2$), 29.58 (CH$_2$), 29.51 (CH$_2$), 29.30 (CH$_2$), 26.11 (CH$_2$), 22.70 (CH$_2$), 14.14 (CH$_3$).

Example 4: Synthesis of Polyethylene Glycol Dicarboxylic Acid, a Surfactant According to Formula (VI)

Method A$_3$.

A surfactant according to formula (VI) was prepared as described for surfactant according to formula (V) (Method A$_1$) from polyethylene glycol (27 g, 18 mmol, 1500 g/mol) in the presence of tetrabutylammonium bromide (3.13 g, 9.70 mmol) and potassium permanganate (17.06 g, 108 mmol) in a mixture of CH$_2$Cl$_2$ (1001 mL), acetic acid (39.90 mL) and water (600 mL). The dicarboxylic acid was obtained in 77% yield (21.17 g, 13.86 mmol).

Method B$_3$.

A surfactant according to formula (VI) was prepared as described for surfactant according to formula (V) (Method B$_2$) from polyethylene glycol (2 g, 1.33 mmol, 1500 g/mol) in the presence of 2,2,6,6-tetramethyl piperidine-1-oxyl (0.08 g, 0.53 mmol) and nitric acid (0.1 mL, 70%) in dichloromethane (10 mL). The dicarboxylic acid was obtained in 92% yield (1.87 g, 1.22 mmol).

$^1$H NMR (400 MHz, CDCl$_3$): δ=4.16 (s, 4H, 2COCH$_2$), 3.69-3.64 (m, 128H, (CH$_2$CH$_2$O)$_{32}$). $^{13}$C NMR (100 MHz, CDCl$_3$): δ=171.40 (CO), 71.30 (CH$_2$COOH), 70.56 (OCH$_2$CH$_2$O).

Example 5

To compare the physical and rheological properties of a drilling fluid containing a polyethylene glycol carboxylic acid ("PEG acid") compound with those of a drilling fluid containing an industry standard wetting agent, three drilling fluids were prepared. The PEG acid had the following structure:

The three drilling fluids were based on the M-I SWACO RHADIANT™ system that includes a blend of three proprietary emulsifiers and fluid-loss control agents specially tailored for oil-based fluid formulations. Drilling Fluid A was prepared by replacing SUREWET® with PEG Acid and reducing the amount of SUREMUL®. A second drilling fluid, Drilling Fluid B, was prepared by replacing SUREWET® with PEG Acid and reducing the amount of SUREMUL® in the drilling fluid. The Drilling Fluid B had 20% more PEG Acid than the Drilling Fluid A and also included magnesium aluminum carbonate (MgAlCO$_3$). The comparative drilling fluid, Drilling Fluid C, was prepared using SUREWET®, as the wetting agent, and SUREMUL®, as an emulsifier.

The three drilling fluids were formulated using the following ingredients: Saraline 185V, a synthetic oil drilling base fluid, available from Shell; SUREMUL®, an amidoamine emulsifier, available from M-I SWACO, LLC (Houston, Tex., USA); SUREWET®, a wetting agent, available from M-I SWACO, LLC (Houston, Tex., USA); MUL XT, an emulsifier for use in non-aqueous fluid systems, available from M-I SWACO, LLC (Houston, Tex., USA); VERSA-GEL HT, a hectorite clay viscosifier for aiding in filtercake formation and filtration control, available from M-I SWACO, LLC (Houston, Tex., USA); ONE-TROL™ HT, an amine-treated tannin filtration control additive designed for use in oil and synthetic-base drilling fluid systems, available from M-I SWACO, LLC (Houston, Tex., USA); ECOTROL RD, a filtration control additive designed for use in oil and synthetic-base drilling fluid systems, available from M-I SWACO, LLC (Houston, Tex., USA); and barite ($BaSO_4$) weighting agent, available from M-I SWACO, LLC (Houston, Tex., USA).

Referring to Table 1, as follows, three drilling fluids were prepared in 30.8 g, 25.6 g, and 25.7 g quantities using a magnetic stir bar. The formulations and other ingredients amounts are provided in Table 1 for the three drilling fluids. To prepare the drilling fluids, the base oil, emulsifiers, and wetting agents were mixed together first for 10 minutes during stage 1, and then the viscosity modifiers and rheology modifiers were added and mixed for another 20 minutes during stage 2. Next, in stage 3 the fluid-loss control additives were added and mixed for 20 minutes, followed by brine and fresh water in stage 4 and barite in stage 5, which were mixed for 30 minutes and 40 minutes, respectively. During stage 2, $MgAlCO_3$ was added as a thinner to Drilling Fluid B. The quantity of base oil used and barite were slightly different for the PEG Acid formulation to provide a specific gravity of 2.20 and an oil/water ratio of 90.0, identical to the respective properties of comparative drilling fluid.

The drilling fluids were left standing still after mixing for 17 hours and then were inspected for sagging and fluid separation prior to rheology measurements. Fluid separation and sagging were inspected visually while sagging was also examined by inserting a micro spatula into the mud to check if the mud was of similar texture (hard or soft) throughout from top to bottom and if there was separation and settlement of solids. If there was separation and settlement of the solids then the mud would appear soft at the top and getting harder at the bottom.

The viscosities of the drilling fluids were tested using a stress and strain controlled Discovery Rheometer. Geometry used was 25 mm rough stainless steel parallel plates due to the presence of barite in the sample. The gap was set at 300 m. Viscosity measurements as a function of shear rate were carried out from 0.004 to 2000 $s^{-1}$ at 0° C. and 50° C. unless indicated otherwise (See FIG. 1). When no force was applied, the three drilling fluids gelled and were strong enough to hold drill solids and weighting materials such as barite. Shear rate experiments provide useful viscosity information of the fluid and whether the fluid has zero shears or is shear thinning. The shear rate experiments also indicated shear rate at which the drilling fluids deform.

Results from the viscosity testing, % Strain, Sagging, and the fluid separation testing, are provided in Table 2-4.

TABLE 1

Formulation and Mixing Procedure for HPHT Oil Based Drilling Fluids

| Ingredient | Function | Fluid with PEG Acid (Drilling Fluid A) (g) | Fluid with PEG Acid (Drilling Fluid B) (g) | Comparative (Drilling Fluid C) (g) | Mixing Order and Time |
|---|---|---|---|---|---|
| Saraline 185V | Base Oil | 4.0767 | 4.0567 | 4.8800 | Stage 1 (10 min) |
| SUREMUL | Emulsifier | 0.3333 | 0.3333 | 0.4000 | |
| SUREWET | Wetting Agent | 0 | 0 | 0.1600 | |
| PEG Acid | Wetting Agent | 0.080 | 0.1000 | 0 | |
| MUL XT | Emulsifier | 0.1333 | 0.1333 | 0.1600 | |
| VERSAGEL HT | Viscosifier | 0.0917 | 0.0917 | 0.1100 | Stage 2 (20 min) |
| Bentone 42 | Rheology Modifier | 0.0917 | 0.0917 | 0.1100 | |
| $MgAlCO_3$ | Rheology Modifier | 0 | 0.0917 | 0 | |
| Lime | Alkalinity Control | 0.2000 | 0.2000 | 0.2400 | |
| ONE-TROL HT | Fluid Loss Control | 0.2667 | 0.2667 | 0.3200 | Stage 3 (20 min) |
| ECOTROL RD | Fluid Loss Control | 0.0267 | 0.0267 | 0.0320 | |
| $CaCl_2$ brine | Internal Phase | 0.9600 | 0.9600 | 1.1400 | Stage 4 (30 min) |
| Fresh water | Internal Phase | 0.2000 | 0.2000 | 0.2360 | |
| Barite | Weight Material | 19.2267 | 19.2267 | 23.0880 | Stage 5 (40 min) |
| Total | | 25.6068 | 25.7785 | 30.8760 | 30.8760 |
| Specific Gravity | | 2.20 | 2.20 | 2.20 | |
| Oil/Water Ratio (volumetric) | | 90.0 | 90.0 | 90.0 | |

TABLE 2

HPHT Oil-Based Drilling Fluids: Viscosities at 0° C.

| Oil-Based Drilling Fluid at 0° C. | Viscosity at shear rates of 10.22 s$^{-1}$ | Viscosity at shear rates of 170 s$^{-1}$ |
|---|---|---|
| Drilling Fluid A | 2660 | 516 |
| Drilling Fluid B | 2537 | 551 |
| Comparative C | 4280 | 626 |

TABLE 3

HPHT Oil-Based Drilling Fluids: Viscosities at 50° C.

| Oil-Based Drilling Fluid at 50° C. | Viscosity at shear rates of 10.22 s$^{-1}$ | Viscosity at shear rates of 170 s$^{-1}$ |
|---|---|---|
| Drilling Fluid A | 695 | 145 |
| Drilling Fluid B | 390 | 101 |
| Comparative C | 358 | 128 |

In Table 2, Drilling Fluids A and B retained their viscoelastic behavior at 0° C. and had lesser viscosities at low and high shear rates than comparative Drilling Fluid C. Thus, Drilling Fluids A and B would also be considered suitable for low temperature drilling operations and would be better drilling fluids than comparative Drilling Fluid C, because having a higher viscosity at low temperatures would require excessive power to initiate drilling, as well as during drilling.

Figure 1:
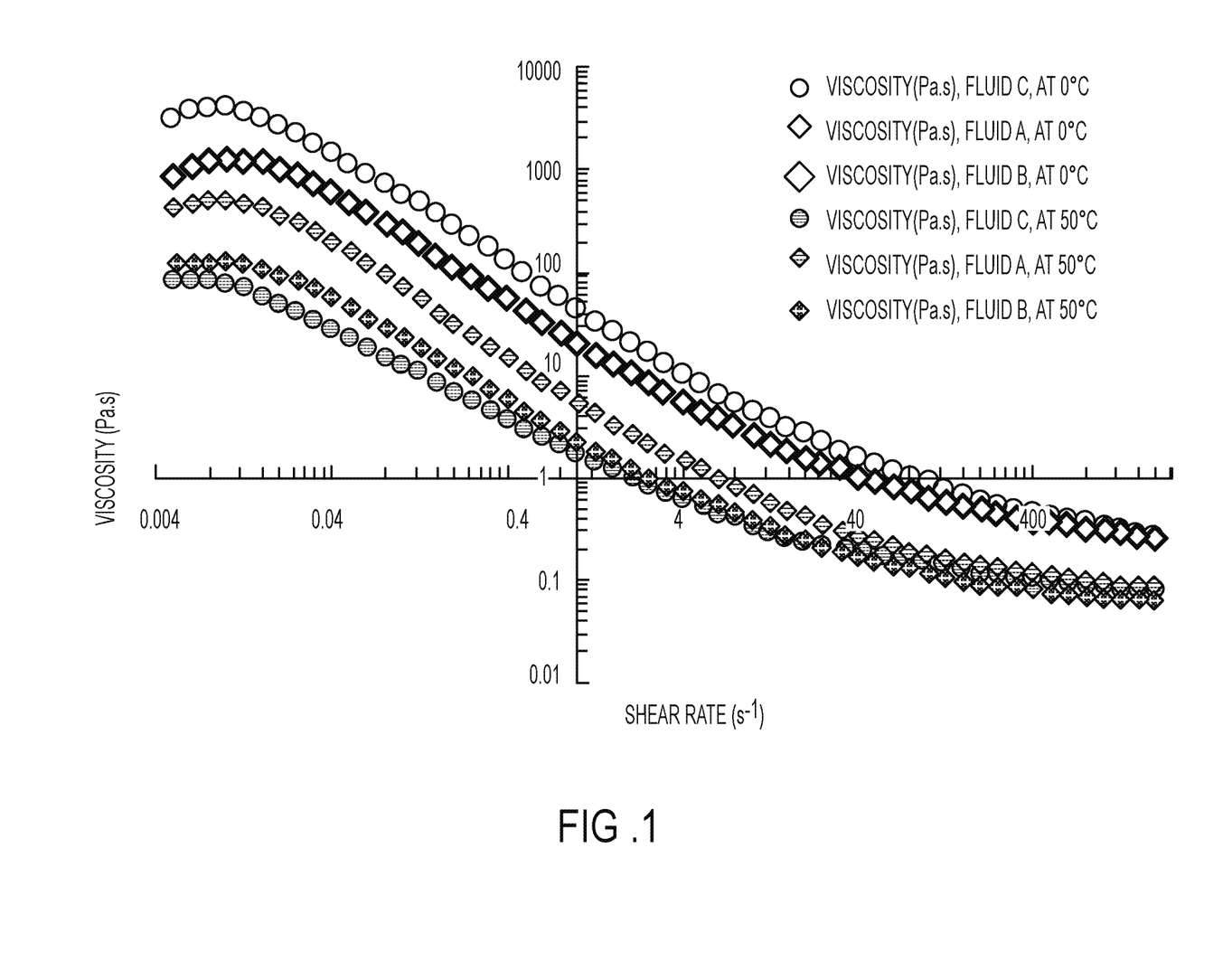
FIG. 1 is a graph of the viscosity as a function of shear rate of three different drilling fluids at 0° C. and 50° C. The drilling fluid are: Drilling Fluid A, Drilling Fluid B, and Comparative Drilling Fluid C as described in Example 5 (see infra).

In FIG. 1, Drilling Fluids A, B and comparative Drilling Fluid C exhibited shear-thinning behavior regardless of their formulation and at temperatures tested. However, at 50° C. Drilling Fluids A and B had greater viscosities at low shear rates of 10.22 s$^{-1}$, thus allowing the drilling fluids to better hold solids while stationary than the comparative Drilling Fluid C. Additionally, Drilling Fluids A and B deformed at approximately half of the strain when compared to Drilling Fluid C. Drilling Fluids A and B showed characteristics of fragile gels, requiring less energy to be disturbed. The results in Table 3 correlated to FIG. 1 in that at a shear rate of 10.22 s$^{-1}$ Drilling Fluids A and B showed higher viscosities than Drilling Fluid C. At 170 s$^{-1}$ Drilling Fluid B had lower viscosity than Drilling Fluid C while Drilling Fluid A had slightly higher viscosity.

In Table 3, the viscosities reflected the sag potential of the fluid. Greater viscosities provide better gel ratios. Drilling Fluid A had slightly greater viscosity than comparative Drilling Fluid C at a shear rate of 170 s$^{-1}$ and a greater viscosity than both comparative Drilling Fluid C and Drilling Fluid B at low shear rates. The viscosity of Drilling Fluid A also decreased faster with increasing shear rates such that it approached comparative Drilling Fluid C at high shear rate and deformed approximately at same strains as Drilling Fluid B.

TABLE 4

Oil-Based Drilling Fluids: % Strain and Separation

| Oil-Based Drilling Fluid | % Strain at 50° C. | Sagging | Fluid Separation |
|---|---|---|---|
| Drilling Fluid A | 0.201 | No | No |
| Drilling Fluid B | 0.200 | No | Trace |
| Comparative C | 0.399 | No | Trace |

Drilling Fluids A and B did not show sagging, and Drilling Fluid A did not show fluid separation after standing static for 17 hours after preparation. Both Drilling Fluids A and B deformed at half of the strains required by Drilling Fluid C, as shown in Table 4 and FIGS. 2-3. Therefore, it required less power to initiate the circulation. Additionally as shown in FIG. 3, Drilling Fluid B became more fluid (G">G') at lower strains than Drilling Fluid C, thereby requiring less power during circulation. In FIG. 4, the phase angles of Drilling Fluid A and Drilling Fluid B also confirmed that these drilling fluids become more fluidic at lower strains than Drilling Fluid C.

These initial test results showed that Drilling Fluids A and B would be better to hold solids while stationary with higher viscosities at low shear rates but lower viscosities at high shear rates than comparative Drilling Fluid C at high temperatures. Lower viscosities of Drilling Fluids A and B at low temperatures than Drilling Fluid C makes these drilling fluids also suitable for low temperature drilling operation as these drilling fluids would require less power to initiate the circulation and during the circulation than Drilling Fluid C.

Figure 2:
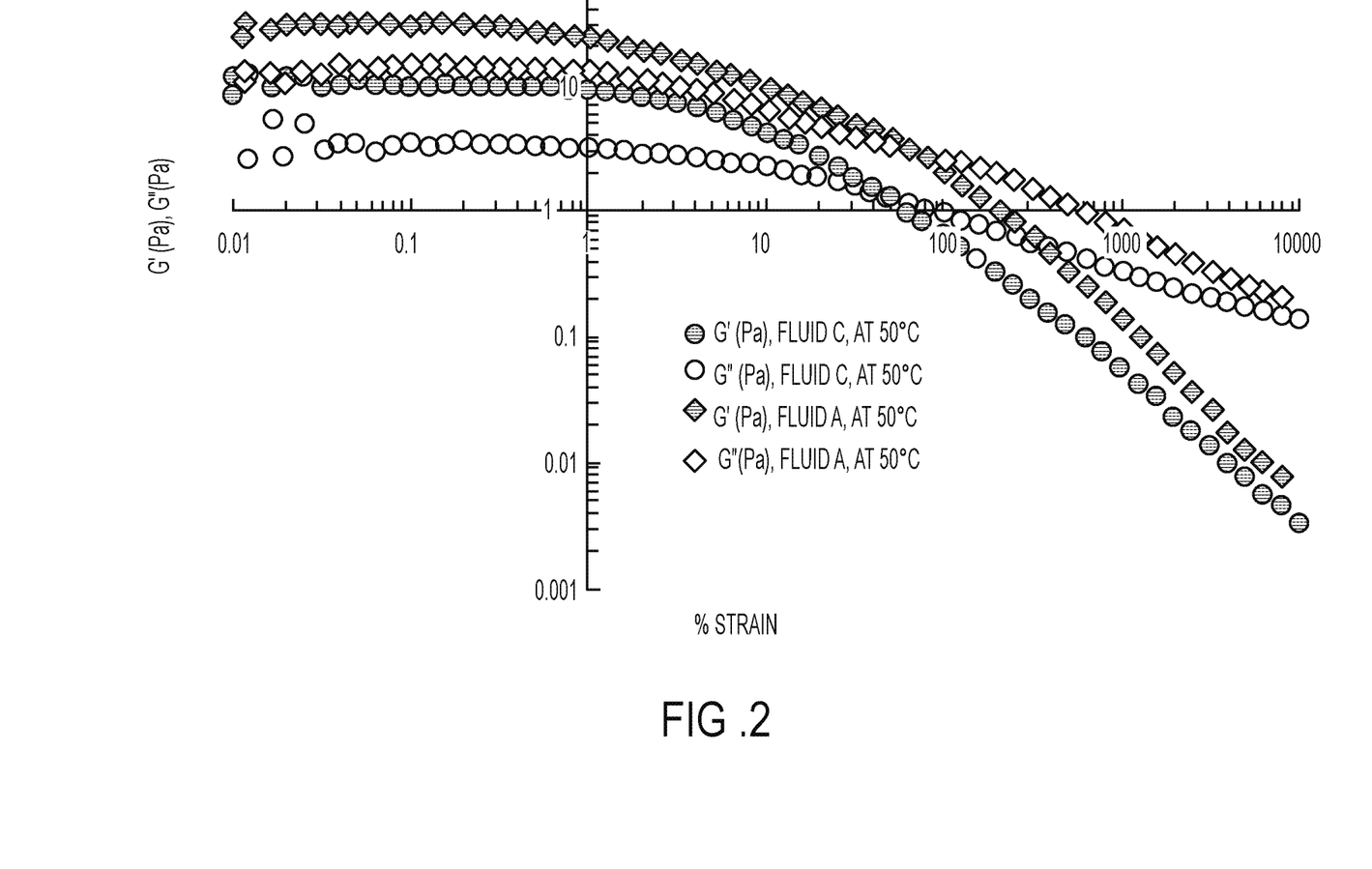
FIG. 2 is a graph of the Storage Modulus and Loss Modulus as a function of Percent Strain at 50° C. The drilling fluids are: Drilling Fluid A and Comparative Drilling Fluid C as described in Example 5 (see infra).
Figure 3:
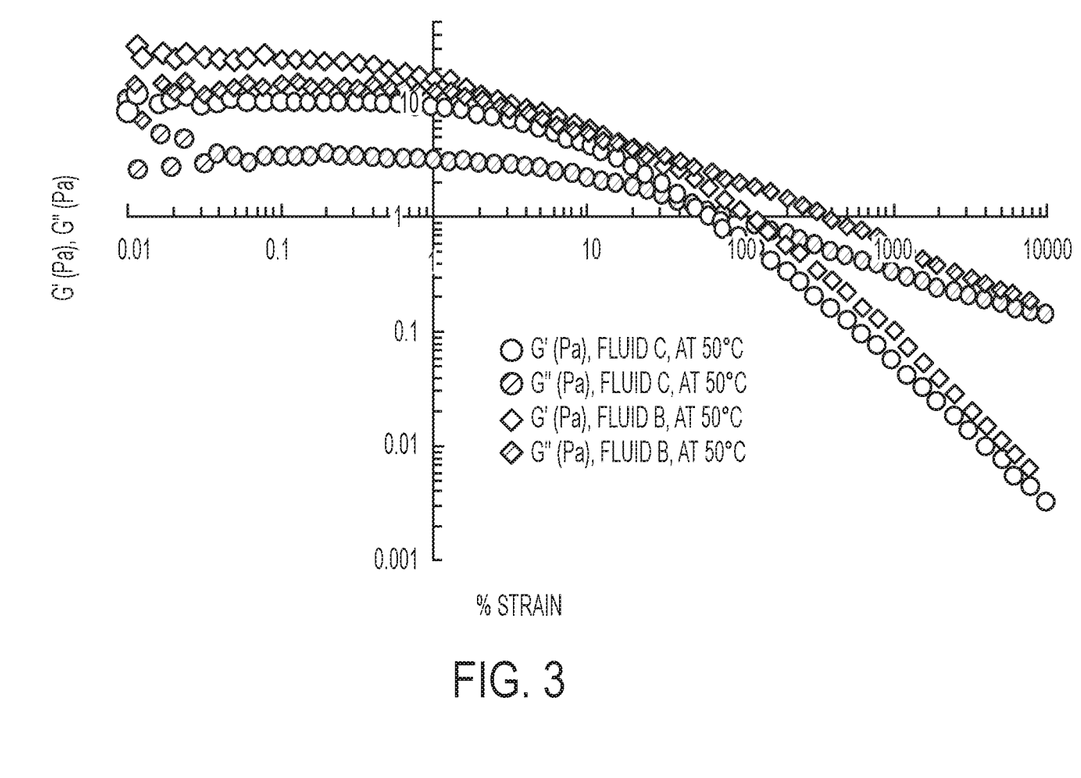
FIG. 3 is a graph of the Storage Modulus and Loss Modulus as a function of Percent Strain at 50° C. The drilling fluids are: Drilling Fluid B and Comparative Drilling Fluid C as described in Example 5 (see infra).
Figure 4:
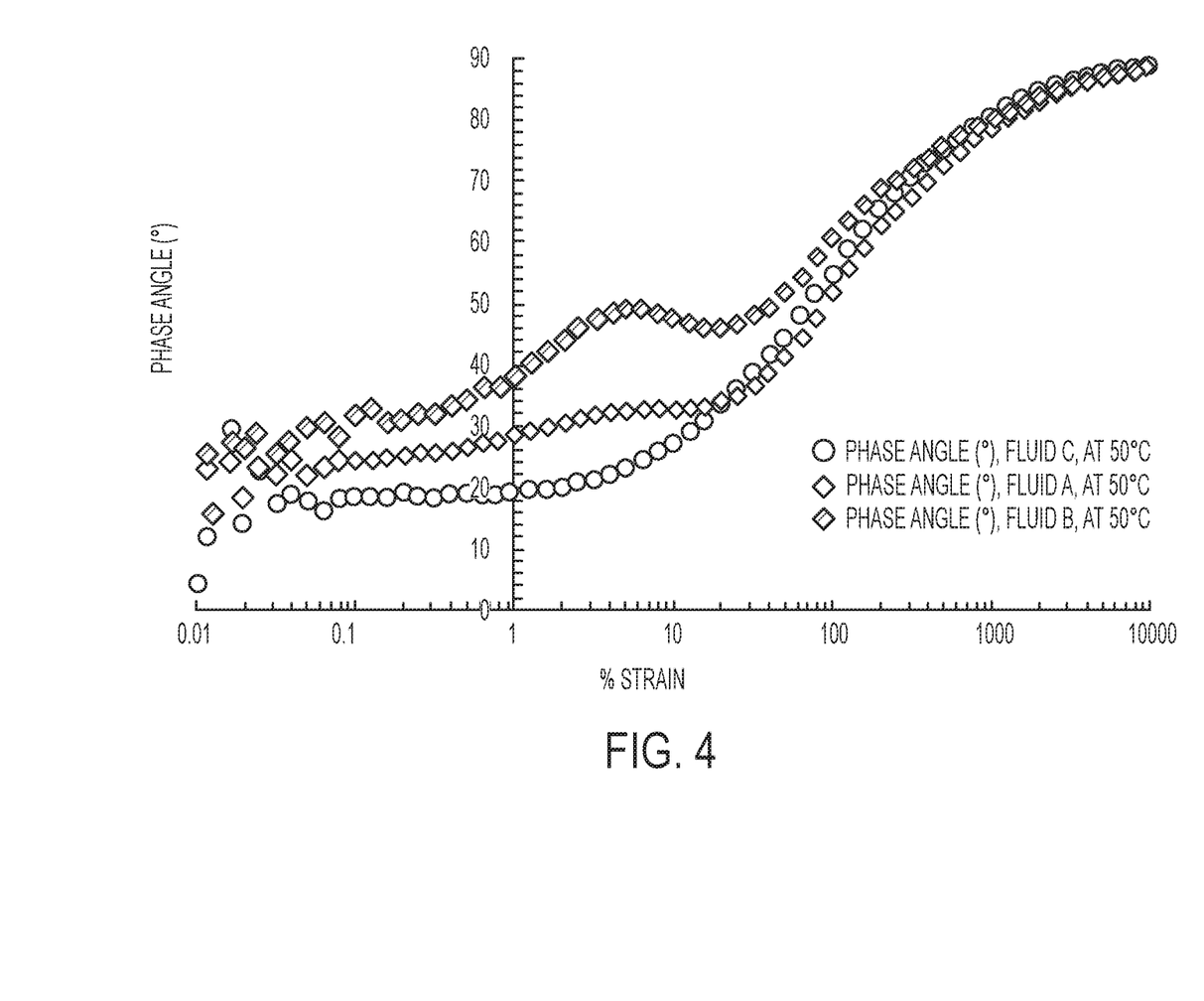
FIG. 4 is a graph of the Phase Angle as a function of Percent Strain at 50° C. The drilling fluids are: Drilling Fluid A, Drilling Fluid B, and Comparative Drilling Fluid C as described in Example 5 (see infra).

In FIGS. 2-4, the storage modulus (G'), loss modulus (G") and phase angle measurements as a function of % strain were monitored at a constant frequency of 1 rad s$^{-1}$ and temperatures of 0° C. and 50° C. from % strain of 0.01 to 10000 to identify Linear Viscoelastic Region. The test involves applying small incremental oscillating (clockwise then counter-clockwise in rotation) stresses to the mud and monitoring its resulting strain (or deformation) response. These measurements could also be used to identify the strength of the dispersion structure (settling stability) and resilience.

It should be noted, that there was less wetting agent in Drilling Fluid A making it a greener drilling fluid. Additionally, Drilling Fluid A was more viscose when stationary at high temperatures than Drilling Fluid C and Drilling Fluid B, thereby allowing Drilling Fluid A to hold cuttings and other particulate matter better than the other drilling fluids.

It should be understood that the various aspects of the oil-based fluid composition, method of making the same, and method for drilling a subterranean well utilizing the same are described and such aspects may be utilized in conjunction with various other aspects.

In a first aspect, the disclosure provides a surfactant of formula (I):

(I)

In formula (I), R$^{1a}$ is a —H, alkyl, or aryl; the subscript x is an integer from 21 to 453; and R$^2$ is alkyl or aryl.

In a second aspect, the disclosure provides the surfactant of the first aspect, where subscript x is selected from 30 to 100.

In a third aspect, the disclosure provides the surfactant of the first aspect or second, where R$^{1a}$ is a radical —CH$_2$—CO—NHR$^5$ and the surfactant has a structure according to formula (II):

(II)

In the third aspect in formula (II), $R^5$ is a alkyl, aryl, alkyl substituted aryl, or aryl substituted alkyl; and $R^2$ and x are defined in formula (I).

In a fourth aspect, the disclosure provides the surfactant according to the third aspect, in which subscript x is between 30 and 40; and $R^2$ and $R^5$ are independently a $(C_1-C_{12})$ hydrocarbyl chosen from the group methyl, ethyl, 1-methylethyl, propyl, n-butyl, 1,1-dimethylethyl, pentyl, hexyl, heptyl, octyl, nonyl, decyl, undecyl, duodecyl.

In a fifth aspect, the disclosure provides the surfactant according to the third aspect, in which subscript x is 32; and $R^2$ and $R^5$ are both n-octyl.

In a sixth aspect, the disclosure provides an oil-based drilling fluid. The oil-based drilling fluid includes an oil phase; an aqueous phase; and at least one surfactant of formula (III).

(III)

In the sixth aspect in the formula (III), $R^3$ is $(C_2-C_{500})$ alkyl or aryl; and $R^{4a}$ is $(C_4-C_{500})$alkyl or $(C_4-C_{500})$heterohydrocarbyl.

In a seventh aspect, the disclosure provides the oil-based drilling fluid according to the sixth aspect, where $R^3$ is a linear, non-branching alkyl, having 15 carbons; and $R^{4a}$ is n-butyl.

In an eighth aspect, the disclosure provides the oil-based drilling fluid according to the sixth aspect, where $R^{4a}$ is a radical —$R^{4b}$—$NH_2$ and the surfactant has a structure according to formula (IV):

(IV)

In the eighth aspect in formula (IV), $R^3$ is $(C_2-C_{500})$alkyl or aryl; and $R^{4b}$ is $(C_4-C_{500})$alkylene or arylene.

In a ninth aspect, the disclosure provides a surfactant. The surfactant of the according of formula (IV):

(IV)

In formula (IV), $R^3$ is $(C_2-C_{500})$alkyl or aryl; and $R^4$ is $(C_4-C_{500})$alkylene, arylene, or combinations thereof.

We claim:

1. A surfactant of formula (I):

(I)

where
$R^{1a}$ is a —H, alkyl, or aryl;
x is an integer from 21 to 453;
$R^2$ is alkyl or aryl.

2. The surfactant according to claim 1, where x is selected from 30 to 100.

3. The surfactant according to claim 1, where $R^{1a}$ is a radical —$CH_2$—CO—$NHR^5$ and the surfactant has a structure according to formula (II):

(II)

where: $R^5$ is a alkyl, aryl, alkyl substituted aryl, or aryl substituted alkyl; and $R^2$ and x are defined in formula (I).

4. The surfactant according to claim 3, where: x is between 30 and 40; and $R^2$ and $R^5$ are independently a $(C_1-C_{12})$hydrocarbyl chosen from the group methyl, ethyl, 1-methylethyl, propyl, n-butyl, 1,1-dimethylethyl, pentyl, hexyl, heptyl, octyl, nonyl, decyl, undecyl, duodecyl.

5. The surfactant according to claim 3, where: x is 32; $R^2$ and $R^5$ are both n-octyl.

* * * * *

UNITED STATES PATENT AND TRADEMARK OFFICE
CERTIFICATE OF CORRECTION

PATENT NO. : 10,870,788 B2
APPLICATION NO. : 16/100829
DATED : December 22, 2020
INVENTOR(S) : Mona Al Batal et al.

It is certified that error appears in the above-identified patent and that said Letters Patent is hereby corrected as shown below:

In the Specification

In Column 3, Line(s) 55, delete "$(c_1-c_{40})$" and insert --$(c_1-c_{20})$--, therefor.

In Column 4, Line(s) 16, delete "$(CH_2)_{14}C(CH_2H_3)_2(CH_2)_5$" and insert --$(CH_2)_{14}C(CH_3)_2(CH_2)_5$--, therefor.

In Column 4, Line(s) 40, delete "$N=C(R^S)$" and insert --$N=C(R^S)_2$--, therefor.

In Column 13, Line(s) 44, delete "$CH_2C_{12}$" and insert --$CH_2Cl_2$--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*